Figure 1:
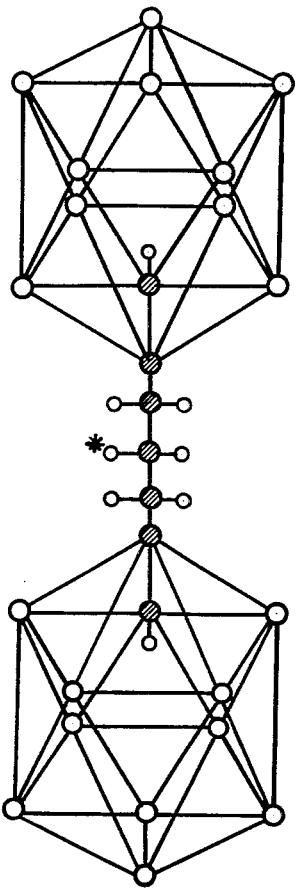

June 2, 1964　　J. W. AGER, JR., ETAL　　3,135,786
ORGANOBORON ESTERS
Filed Dec. 29, 1960

○　BORON

◉　CARBON o　HYDROGEN ON CARBON
(HYDROGEN ATOMS ON BORON
OMITTED FOR CLARITY)

FORMULA - A

INVENTORS:
JOHN W. AGER, JR.
BY THEODORE L. HEYING

Walter D. Hunter
AGENT

United States Patent Office 3,135,786
Patented June 2, 1964

3,135,786
ORGANOBORON ESTERS
John W. Ager, Jr., Princeton, N.J., and Theodore L. Heying, North Haven, Conn., assignors to Olin Mathieson Chemical Corporation, a corporation of Virginia
Filed Dec. 29, 1960, Ser. No. 79,948
2 Claims. (Cl. 260—488)

This invention relates to organoboron esters and to a method for their preparation. The organoboron compounds of this invention are prepared by reacting a carboranyl or discarboranyl alcohol with an anhydride of an aliphatic carboxylic acid.

The carboranyl alcohols which are employed as reactants in the present invention can be prepared by a variety of methods as described in John W. Ager, Jr. et al. application Serial No. 801,960 filed March 25, 1959; in John W. Ager, Jr. et al. application Serial No. 801,961, filed March 25, 1959; and in Roy P. Alexander et al. application Serial No. 809,570, filed April 28, 1959.

In accordance with the method set forth in above application Serial No. 801,960 carboranyl alcohols can be prepared by the alkaline hydrolysis of compounds of the class $RR'M_{10}H_8(CR''CR''')$ wherein R and R' are each selected from the class consisting of hydrogen and an alkyl radical containing from one to five carbon atoms, wherein R'' and R''' are each selected from the class consisting of hydrogen, an alkyl radical, and radicals of the class

wherein $R_1$ is a bivalent saturated hydrocarbon radical containing 1 to 8 carbon atoms and $R_2$ is selected from the class consisting of a benzyl radical and alkyl radicals containing 1 to 6 carbon atoms, at least one radical of the class

being present, the total number of carbon atoms in $R_1$ radical portion of R'' and R''' taken together not exceeding eight.

Compounds of the above class can be prepared by the reaction of decaborane or an alkylated decaborane having 1 to 2 alkyl groups containing 1 to 5 carbon atoms in each alkyl group with an acetylenic ester in the presence of any of a wide variety of amines, ethers, nitriles or sulfides. The acetylenic esters include those of a monocarboxylic acid having from 1 to 6 carbon atoms and an acetylenic monohydric or dihydric alcohol containing from 3 to 10 carbon atoms. The preparation of these acetylenic esters is described in application Serial No. 797,809, filed March 6, 1959 of John W. Ager, Jr. et al. For example, the compound

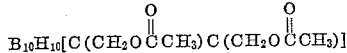

may be prepared from decaborane and butyndiyl-1,4 diacetate at 110° C. in a mixture of diethyl sulfide and diethyl ether. Other suitable organoboron esters include

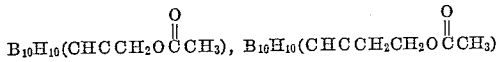

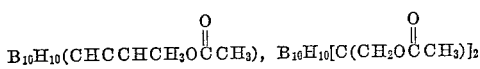

The compound hydroxymethylcarborane

for example, can be prepared according to the process of above application Serial No. 801,960 by refluxing the compound

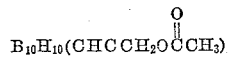

in a methanolic potassium hydroxide solution. Halogen containing organoboron compounds of the carborane class can be hydrolyzed by reaction with an aqueous lower alkanol solution of an alkali metal hydroxide to yield carboranyl alcohols useful in the process of this invention according to the process set forth in the above application Serial No. 801,961. A method for preparing carboranyl alcohols suitable for the process of this invention by successively reacting organoboron compounds of the carborane class with an alkali metal alkyl or aryl, an alkylene oxide and water is described in the above application Serial No. 809,570.

The organoboron compounds known as carboranes, are of the class consisting of $RR'B_{10}H_8(CR''CR''')$ and $(RR'B_{10}H_8)_2(CHCR_1CCH)$ wherein R and R' are each selected from the class consisting of hydrogen and an alkyl radical containing from 1 to 5 carbon atoms, wherein R'' and R''' are each selected from the class consisting of hydrogen, an alkyl radical and a monoalkenyl hydrocarbon radical, at least one of R'' and R''' being hydrogen, and the total number of carbon atoms in R'' and R''' taken together not exceeding 8, and wherein $R_1$ is a bivalent hydrocarbon radical containing from 1 to 6 carbon atoms. Carborane type compounds can be prepared as set forth in application Serial No. 813,032 filed May 13, 1959 of Ager, Heying and Mangold.

In general, the carboranes can be prepared by reacting a decaborane or an alkylated decaborane having one to two alkyl groups containing 1 to 5 carbon atoms in each alkyl group with an acetylenic or di-acetylenic hydrocarbon containing from two to ten carbon atoms in the presence of a wide variety of ethers, nitriles, sulfides or amines. For example, carborane[$B_{10}H_{10}$(CHCH)], can be prepared by reacting for about 12 hours at 125° C. a mixture of decaborane and tetrahydrofuran in an autoclave pressured to 100 p.s.i. with acetylene.

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in application Serial No. 497,407, filed March 28, 1955, by Elmar R. Altwicker, Alfred B. Garrett, Samuel W. Harris and Earl A. Weilmuenster.

The organoboron esters of this invention are prepared by reacting a carboranyl or dicarboranyl alcohol with an anhydride of an aliphatic carboxylic acid of the formula

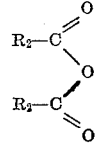

wherein $R_2$ is an alkyl group having from 1 to 5 carbon atoms. Suitable anhydrides include, for example, acetic, propionic, n-butyric, isobutyric, and n-valeric anhydride.

The carboranyl and dicarboranyl alcohols useful as starting materials in the process of this invention can be represented by following formulae:

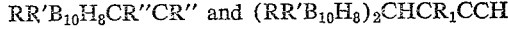

wherein $R_1$ is bivalent hydroxy hydrocarbon radical containing 1 to 6 carbon atoms, wherein R and R' are each selected from the class consisting of hydrogen and an alkyl radical containing from 1 to 5 carbon atoms, wherein R'' and R''' are selected from the class consisting of hydrogen, an alkyl radical and a hydroxyalkyl radical, one of R″ and R‴ being a hydroxyalkyl radical with the proviso that the other be selected from the group consisting of hydrogen and alkyl radical, and the total number of carbon atoms in R″ and R‴ together not exceeding 8. Bivalent hydroxy hydrocarbon radicals substituents of R₁ include, for example

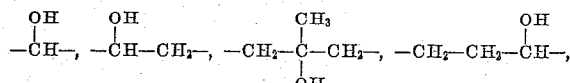

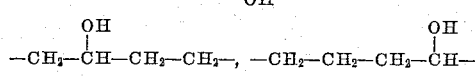

and

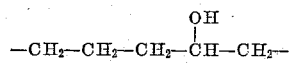

The ratio of the reactants can be varied widely from about 0.5 to 5 moles of the anhydride of the aliphatic carboxylic acid to 1.0 mole of the carboranyl or dicarboranyl alcohol with the preferred range being from about 1.2 to 2.5 moles of the anhydride per mole of the alcohol. In a like manner the reaction temperature can also be varied over a wide range of from about −10° C. to about 75° C. with the preferred range being about 0° C. to about 35° C. Although atmospheric pressure reactions are convenient, the reaction pressure can be varied from about 0.5 to about 5 atmospheres.

A wide variety of esterification catalysts can be employed to increase the reaction rate. Suitable catalysts include perchloric acid, benzene sulfonic acid, toluene sulfonic acid, methane sulfonic acid, naphthalene disulfonic acid, phenylphosphonic acid, p-tolyl boronic acid, anhydrous sodium acetate, etc. Generally about 0.01 to about 5.0 percent by weight of the catalyst can be used, depending upon the particular catalyst. Although the reaction can be performed in the absence of a solvent the use of a solvent will enhance the completion of the reaction. Any solvent which does not react with the reactants or the product and in which the reactants are soluble can be employed. The lower alkyl esters of aliphatic monocarboxylic acids which contain 1 to 5 carbon atoms in the alkyl group such as methyl acetate, ethyl acetate, isopropyl acetate, ethyl propionate, methyl n-butyrate, propyl n-butyrate, amyl n-butyrate, are representative of the useful solvents which can be employed.

Suitable carboranyl alcohols which can be employed in this invention include 1,2-dicarboranyl ethanol $(B_{10}H_{10}CHCCH_2CHOHCCHB_{10}H_{10})$ 1,3-dicarboranyl propanol-1

$(B_{10}H_{10}CHCCH_2CH_2CHOHCCHB_{10}H_{10})$ 1,3-dicarboranyl propanol-2

$(B_{10}H_{10}CHCCH_2CHOHCH_2CCHB_{10}H_{10})$ 1,3-dicarboranyl butanol-1

$(B_{10}H_{10}CHCCH_2CH_2CH_2CHOHCCHB_{10}H_{10})$ 1,3-dicarboranyl butanol-2

$(B_{10}H_{10}CHCCH_2CHOHCH_2CH_2CCHB_{10}H_{10})$ hydroxymethylcarborane $(B_{10}H_{10}CHCCH_2OH)$, hydroxymethyl-methylcarborane $(B_{10}H_9CH_3CHCCH_2OH)$, α-hydroxyethylcarborane $(B_{10}H_{10}CHCCHOHCH_3)$, α-hydroxypropylcarborane $(B_{10}H_{10}CHCCHOHCH_2CH_3)$, β-hydroxybutylcarborane $(B_{10}H_{10}CHCCH_2CHOHCH_2CH_3)$ C-n-propyl-C-hydroxycarborane $(B_{10}H_{10}COHCCH_2CH_2CH_3)$ hydroxy-tert. butylcarborane $(B_{10}H_{10}CHCCH_2CCH_3CH_3OH)$ etc.

Dicarboranyl alcohols useful as starting materials in this invention can be conveniently prepared by a Grignard reaction. In the first step a haloalkyl carborane is reacted with magnesium in dry ether to form the Grignard reagent and in the second step a solution of an alkyl formate in dry ether is reacted with the previously prepared Grignard reaction to yield a dicarboranyl alcohol. By this process the compound 1,3-dicarboranyl propanol-2 $(B_{10}H_{10}CHCCH_2CHOHCH_2CCHB_{10}H_{10})$ can be made by first reacting bromomethylcarborane $(B_{10}H_{10}CHCCH_2Br)$ in dry ether with magnesium to form the Grignard reagent and then in a second step the desired compound is formed by reacting a solution of ethyl formate in dry ether with the Grignard reagent.

Haloalkyl carboranes can be prepared in the manner set forth in John W. Ager, Jr., et al. application Serial No. 797,810, filed March 6, 1959. For example, bromomethylcarborane can be formed by refluxing propargyl bromide and decaborane in the presence of diethyl sulfide and di-n-propyl ether.

The organoboron products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods when ignited by conventional means, such as a pyrotechnic type igniter, and are mechanically strong enough to withstand ordinary handling.

The process of this invention is illustrated in detail by the following examples.

In the examples, the term "moles" signifies gram moles.

*Example I*

To a mixture of 1 gram (0.0029 mole) of 1,3-dicarboranyl propanol-2, 10 ml. (0.10 mole) of ethyl acetate and 5 ml. (0.049 mole) of acetic anhydride in a 100 ml. flask there was added three drops of perchloric acid. On addition of the acid the temperature of the mixture rose from room temperature to about 40° C. After the mixture had been allowed to stand for one-half hour at room temperature, the solvent was distilled off under reduced pressure. Water (50 ml.) was added to the residue and the mixture was extracted with 100 ml. of ether. The ether fraction was washed with 25 ml. of a 10 percent sodium bicarbonate solution, dried over magnesium sulfate and distilled. From the residue there was obtained after two crystallizations from heptane-toluene mixture (1:1) 0.6 gram of 1,3-dicarboranylpropyl-2-acetate $(B_{10}H_{10}CHCCH_2CH(OOCCH_3)CH_2CCHB_{10}H_{10})$ This yield corresponds to 47 percent of the theoretical amount. The melting point was 206°–207.5° C. By analysis the product was found to contain 54.5, 54.7 percent boron, 28.7, 28.1 percent carbon and 7.98, 8.11 percent hydrogen as compared to the theoretical value of 56.0 percent boron, 28.0 percent carbon and 7.77 percent hydrogen.

*Example II*

The preceding experiment was repeated using 3 grams (0.0087 mole) of 1,3-dicarboranyl propanol-2, 20 ml. (0.20 mole) of ethyl acetate, 7 ml. (0.069 mole) of acetic anhydride and 4 drops of perchloric acid. A temperature increase of 12° C. was noted on addition of the acid. After standing for one hour the product was recovered as in the previous experiment. After one crystallization from a heptane-toluene mixture 2.6 grams (74 percent of the theoretical yield) of 1,3-dicarboranylpropyl-2-acetate (a white solid) was recovered. The melting point of the product was found to be 206°–210° C.

*Example III*

1,3-dicarboranyl propanol-2, 47.4 grams (0.139 mole) was charged to a 500 ml. Erlenmeyer flask, then 22 ml. acetic anhydride was added and the mixture was stirred. In the next step about 5 drops of perchloric acid was added. The temperature rose slowly and after about 10 minutes the reaction mixture solidified. An additional 11 ml. of acetic anhydride was added and the solid was broken up with a stirring rod. After standing about 5 minutes the mixture again began to solidify and an additional 20 ml. of acetic anhydride was added. This mixture was left standing for 1 hour at which time 200 ml. water was added and the lumps were broken up. The resulting mixture was stirred for 2 hours, filtered and the solid washed four times with 100 ml. portions of water, two times with 100 ml. portions of a 10 percent sodium bicarbonate solution and again with 100 ml. of water. The solid residue was dissolved in 300 ml. of ether. After drying over magnesium sulfate and filtering, the ether was removed by distillation and 53 grams of 1,3-dicarboranyl-propyl-2-acetate was obtained. This corresponds to the theoretical yield.

The compound of the formula

prepared as described in Examples I, II and III has the same structural formula as structural Formula A in FIGURE 1 with the exception that the hydrogen atom denoted by the single asterisk is replaced by the radical:

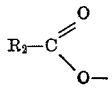

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 95 parts by weight of the oxidizer are used. In the propellant, the oxidizer and the product of the present process are formulated in intimate admixture with each other as by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde and phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

What is claimed:

1. Organoboron esters selected from the class consisting of:

$R_2COO(CR''CR'''B_{10}H_8RR')$ and
$R_2COO[CHCR_1CCH(B_{10}H_8RR')_2]$ wherein $R_1$ is a trivalent hydrocarbon radical containing 1 to 6 carbon atoms, wherein $R_2$ is an alkyl radical containing 1 to 5 carbon atoms, where R and R' are each selected from the class consisting of hydrogen and an alkyl radical containing 1 to 5 carbon atoms, where R'' and R''' are selected from the class consisting of hydrogen, an alkyl radical and a bivalent hydrocarbon radical, one of R'' and R''' being a bivalent hydrocarbon radical with the proviso that the other be selected from the group consisting of hydrogen and an alkyl radical, and the total number of carbon atoms in R'' and R''' together not exceeding 8.

2. 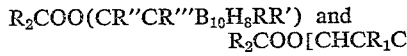

No references cited

UNITED STATES PATENT OFFICE
CERTIFICATE OF CORRECTION

Patent No. 3,135,786　　　　　　　　　　　　　　　　June 2, 1964

John W. Ager, Jr., et al.

It is hereby certified that error appears in the above numbered patent requiring correction and that the said Letters Patent should read as corrected below.

Column 1, line 13, for "discarboranyl" read -- dicarboranyl --; line 25, for "$RR'M_{10}H_8(CR''CR''')$" read -- $RR'B_{10}H_8(CR''CR''')$ --; line 41, before "$R_1$" insert -- the --; column 2, line 66, for "$RR'B_{10}H_8CR''CR''$" read -- $RR'B_{10}H_8CR''CR'''$ --.

Signed and sealed this 13th day of October 1964.

(SEAL)
Attest:

ERNEST W. SWIDER
Attesting Officer

EDWARD J. BRENNER
Commissioner of Patents